United States Patent [19]

Ishiguro et al.

[11] 4,190,344
[45] Feb. 26, 1980

[54] DRIVING CIRCUIT FOR CAMERA SHUTTERS

[75] Inventors: Yasuo Ishiguro; Kenji Wakazono, both of Tokyo, Japan

[73] Assignee: Copal Company Limited, Tokyo, Japan

[21] Appl. No.: 859,194

[22] Filed: Dec. 9, 1977

[30] Foreign Application Priority Data

Dec. 27, 1976 [JP] Japan .................. 51-159906

[51] Int. Cl.² .................................................. G03B 9/08
[52] U.S. Cl. .................................. 354/234; 354/267
[58] Field of Search ............ 354/23 D, 50, 51, 60 R, 354/60 E, 60 L, 234, 235, 258, 266–268, 60 A; 361/155, 156, 187

[56] References Cited

U.S. PATENT DOCUMENTS

| | | | |
|---|---|---|---|
| 3,533,345 | 10/1970 | Starp | 354/234 |
| 3,765,006 | 10/1973 | Takahashi et al. | 354/60 L X |
| 3,776,116 | 12/1973 | Miyakawa et al. | 354/234 |
| 3,947,855 | 3/1976 | Inoue et al. | 354/60 L X |
| 4,024,553 | 5/1977 | Maitani et al. | 354/268 X |

FOREIGN PATENT DOCUMENTS 2621547  11/1976  Fed. Rep. of Germany ........ 354/60 L Primary Examiner—L. T. Hix
Assistant Examiner—William B. Perkey
Attorney, Agent, or Firm—Cushman, Darby & Cushman

[57] ABSTRACT

A shutter driving circuit including a voltage judging circuit and indicating circuit in order to always properly make shutter opening and closing operations, whereby an electric current is prevented from flowing to driving coils and such state can be indicated by the indicating circuit when the voltage of a current source for feeding a current to a pair of driving coils to be made to make opening and closing motions of the shutter by the voltage judging circuit is below a predetermined value.

2 Claims, 4 Drawing Figures

DRIVING CIRCUIT FOR CAMERA SHUTTERS

BACKGROUND OF THE INVENTION

1. Field of the Invention

This invention relates to a driving circuit for cameras wherein the opening and/or closing operation of a shutter is arranged to be made by the energization of driving coils.

2. Description of the Prior Art

Controlling the opening operation of a shutter through the energization of a driving coil is known. The shutter opening operation may be made directly by the energization of the coil or a mirror may be first driven by the energization of the coil and then the shutter opening operation made as in a single-lens reflex camera. In such cases, however, when the voltage of a current source for energizing the coil is below a predetermined value, the starting of the shutter opening and closing operations become so unstable that no proper exposure is made or the shutter will not open at all or will remain open. Further, such disadvantage is likely to occur in current source of a large capacity which can not be used in the case of continuous photographing.

SUMMARY OF THE INVENTION

An object of the present invention is to make it possible to feed an electric current to driving coils only when the voltage of a current source used to energize the driving coils is above a predetermined value or has reached the predetermined value when a shutter is released.

According to the present invention, this object is attained by providing a voltage judging circuit for judging whether the voltage of a current source used to energize driving coils is above a predetermined value or has reached it so that an electric current will be passed to the driving coils only when this judging circuit judges that the source voltage is above or has reached the predetermined value. The current source may be a battery or a capacitor which can be charged by the battery.

In the development of the present invention, the driving circuit includes an indicating circuit so that, when the shutter is released, when the current source voltage is below the predetermined value or until it reaches the predetermined value, the indicating circuit will operate to inform the photographer of such fact. The indicating means may be a luminous element.

This and other objects of the present invention will become more apparent during the course of the following detailed description and appended claims.

DESCRIPTION OF THE PREFERRED EMBODIMENT

First of all, the present invention shall be described in detail with reference to FIGS. 1 and 2. In each of these embodiments, capacitors which can be charged by a battery is used as current source means for energizing driving coils.

Figure 1:
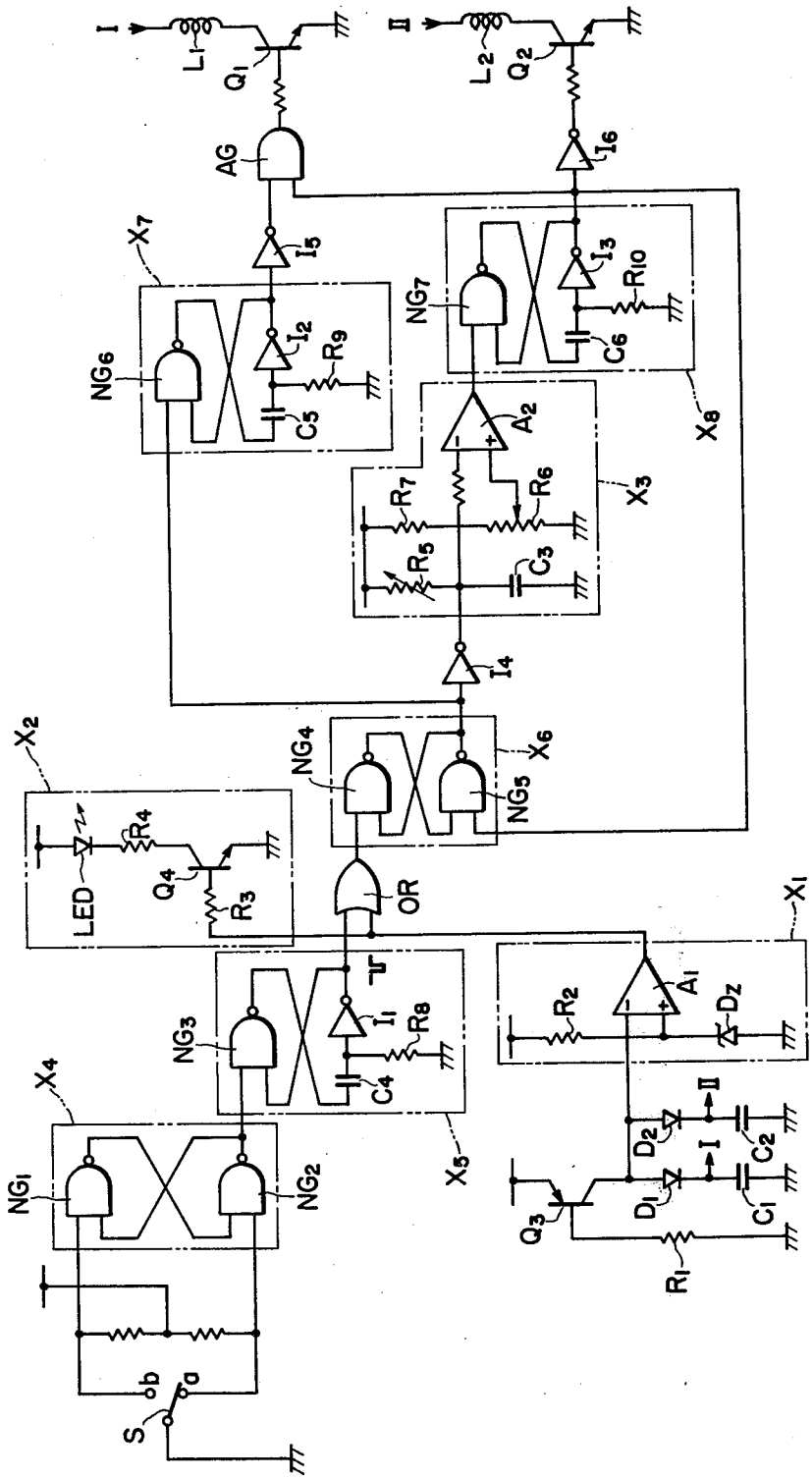
FIG. 1 is a wiring diagram showing somewhat block-diagrammatically an embodiment of the driving circuit according to the present invention.
Figure 2:
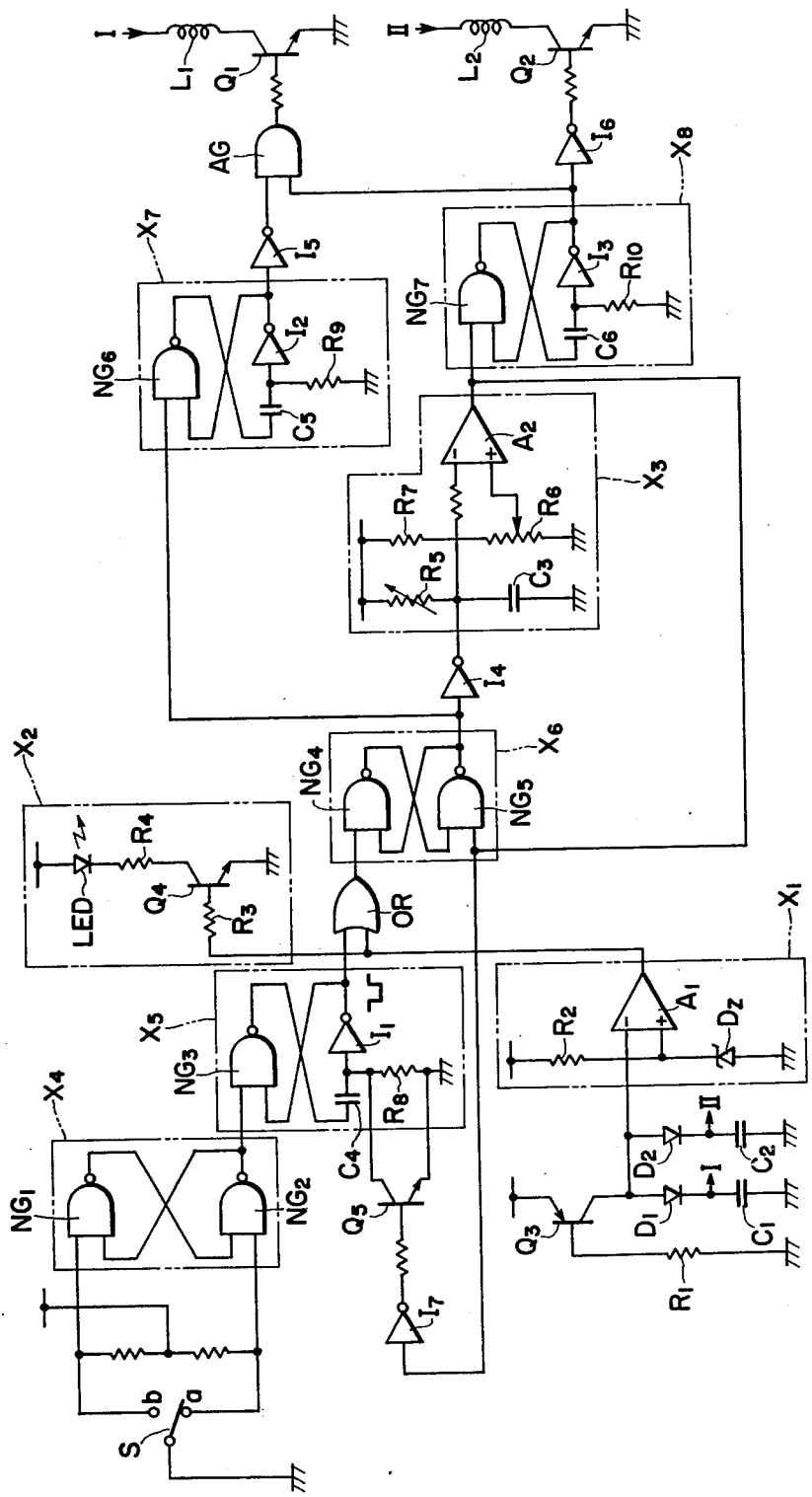
FIG. 2 is a wiring diagram showing another embodiment somewhat different from that of FIG. 1.

In FIG. 1, reference symbols $L_1$ and $L_2$ indicate driving coils for making an opening operation and closing operation of a shutter. $C_1$ and $C_2$ indicate capacitors for energizing the driving coils $L_1$ and $L_2$ with discharge currents from them. $Q_1$ and $Q_2$ indicate transistors used as switching elements for keeping a circuit including the capacitor $C_1$ and driving coil $L_1$ and a circuit including the capacitor $C_2$ and driving coil $L_2$ in respective operating states when made conductive. $Q_3$ and $R_1$ indicate respectively a transistor and resistor constituting a constant current circuit for charging the capacitors $C_1$ and $C_2$. $D_1$ and $D_2$ indicate diodes for preventing interference between them. $A_1$, $R_2$ and $D_z$ indicate respectively a comparator, resistor and zener diode constituting a judging circuit $X_1$ for judging the charged states of the capacitors $C_1$ and $C_2$. $Q_4$, $R_3$, $R_4$ and LED indicate respectively a transistor, resistors and a luminous element for constituting an indicating circuit $X_2$. $A_2$, $C_3$, $R_5$, $R_6$ and $R_7$ indicate respectively a comparator, capacitor, variable resistor, potentiometer and resistor for constituting an exposure time controlling circuit $X_3$. $NG_1$ and $NG_2$ indicate NAND gates for constituting a first flip-flop circuit (Which shall be referred to as an FF circuit hereinafter) $X_4$. $NG_3$, $C_4$, $R_8$ and $I_1$ indicate respectively a NAND gate, capacitor, resistor and inverter constituting a first one-shot multi-vibrator circuit (which shall be referred to as an OSM circuit hereinafter) $X_5$. OR indicates an OR gate. $NG_4$ and $NG_5$ indicate NAND gates constituting a second FF circuit $X_6$. $NG_6$, $C_5$, $R_9$ and $I_2$ indicate respectively a NAND gate, capacitor, resistor and inverter constituting a second OSM circuit $X_7$. $NG_7$, $C_6$, $R_{10}$ and $I_3$ indicate respectively a NAND gate, capacitor, resistor and inverter constituting a third OSM circuit $X_8$. $I_4$, $I_5$ and $I_6$ indicate inverters. AG indicates an AND gate. S indicates a switch which is changed over in association with the shutter releasing operation.

The operation of the above mentioned circuit device shall be explained in the following.

In photographing, when a current source switch (not illustrated) is first closed in the first stage, a voltage will be fed to the entire circuit. Thereby, the capacitors $C_1$ and $C_2$ will begin to be charged through the constant current circuit consisting of the transistor $Q_3$ and resistor $R_1$. In such case, in the initial period of the charging, as the potential of a inverting input terminal (−) to which the voltage between the terminals of the capacitors $C_1$ and $C_2$ is given will be lower than the potential of a non-inverting input terminal (+) given by the zener diode $D_z$, the output of the judging circuit $X_1$, that is, the output of the comparator $A_1$ will be held on the "H" level. Therefore, the transistor $Q_4$ of the indicating circuit $X_2$ will be conductive and the luminous element LED will continue to be lighted and will indicate that the voltage between the terminals of the capacitors $C_1$ and $C_2$ has not yet reached a level on which the driving coils $L_1$ and $L_2$ can be well energized. In other words, it will be indicated that, in this state, the shutter opening and closing operations will not be able to be properly made. Thereafter, when the voltage between the terminals of the capacitors $C_1$ and $C_2$ reaches a predetermined value, the output of the judging circuit $X_1$ will turn to the "L" level. As a result, an input on one side of the OR gate OR will turn to the "L" level, the transistor $Q_4$ will become non-conductive and the luminous element LED will be extinguished and will indicate that the shutter opening and closing operations can be properly made. Therefore, in the second stage, when the shutter releasing operation is made and the switch S is temporarily connected from the terminal a to the terminal b, the output of the first FF circuit $X_4$ will be temporarily of the "L" level, the first OSM circuit $X_5$ will be set and its output will be turned to the "L" level for a short time. At this time, the output of the OR gate OR will turn to the "L" level. As a result, the second FF circuit $X_6$ will be reset, its output will turn to the "L" level, the second OSM circuit $X_7$ will be set and its output will be turned to the "L" level for a predetermined time. Further, as the input on one side connected to the output of the third OSM circuit $X_8$ will be on the "H" level and the input connected to the inverter $I_5$ will be also on the "H" level, the output of the AND gate AG will be on the "H" level. As a result, the transistor $Q_1$ will be conductive and a large current will be fed to the driving coil $L_1$ from the capacitor $C_1$. Therefore, the driving coil $L_1$ will be energized sufficiently to positively open the shutter. On the other hand, by the turning of the FF circuit $X_6$, the output of the inverter $I_4$ will be on the "H" level. Therefore, the capacitor $C_3$ will begin to be charged through the variable resistor $R_5$ for controlling the exposure time. When the potential of the input terminal (−) becomes higher than the potential of the input terminal (+) given by the resistor $R_7$ and potentiometer $R_6$, the output of the exposure time controlling circuit $X_3$, that is, the output of the comparator $A_2$ will turn to the "L" level. Thereby the third OSM circuit $X_8$ will be set and its output will be on the "L" level for a predetermined time. Therefore, the output of the inverter $I_6$ will turn to the "H" level and the transistor $Q_2$ will be made conductive. As a result, a large current will be fed to the driving coil $L_2$ from the capacitor $C_2$ for a short time to energize the coil $L_2$ sufficiently to positively close the shutter after the lapse of a time determined by the exposure time controlling circuit $X_3$.

In the above mentioned case, the time for which the transistor $Q_1$ remains conductive is a time for which the second OSM circuit $X_7$ remains in the inherent turned state or a time until the third OSM circuit $X_8$ turns and the output of the AND gate AG turns to the "L" level. Further, the time for which the transistor $Q_2$ remains conductive is a time for which the third OSM circuit $X_8$ remains in the inherent turned state. As the switch S is only temporarily changed over to the terminal b from the terminal a, the first FF circuit $X_4$ will be immediately reset. When the third OSM circuit $X_8$ turns to the "L" level, the second FF circuit $X_6$ will be reset. Thus the current source switch will be opened in association with the shutter closing operation and all will return to the initial state.

In the above mentioned embodiment explained with reference to FIG. 1, after the luminous element LED is extinguished, the releasing operation is made. Now, a modified embodiment wherein, if the switch S is kept changed over to the terminal b from the terminal a by the releasing operation, when the charged voltage of the capacitors $C_1$ and $C_2$ reaches a predetermined value, the shutter opening and closing operations will be made shall be explained with reference to FIG. 2.

The difference of this embodiment from that of FIG. 1 is that the time for which the output of the first OSM circuit $X_5$ remains turned to the "L" level is set to be long, the resetting signal for the second FF circuit $X_6$ is made an output of the exposure time controlling circuit $X_3$ and, in order to make the resetting positive, the transistor $Q_5$ is connected in parallel with the resistor $R_8$ of the first OSM circuit $X_5$ and is made to be controlled through the inverter $I_7$. Therefore, the same reference symbols shall be only given to the same respective elements and parts as in the embodiment of FIG. 1 and the explanation of the arrangement shall be omitted.

The operation shall be explained in the following.

When a voltage is fed to the entire circuit by the releasing operation and the switch S is temporarily connected to the terminal b from the terminal a, the first OSM circuit $X_5$ will be set and the output will turn to the "L" level for a predetermined time. While the output of the first OSM circuit $X_5$ is placed on the "L" level, if the output of the judging circuit $X_1$ turns to the "L" level, the second FF circuit $X_6$ will be set, the output will turn to the "L" level and then the operation until the shutter is closed will be the same as in the case of the embodiment of FIG. 1. Further, when the output of the exposure time controlling circuit $X_3$ turns to the "L" level, if the output of the first OSM circuit $X_5$ has returned to the "H" level and the output of the OR gate OR is on the "H" level, the second FF circuit $X_6$ will be reset only by the turning signal of the exposure time controlling circuit $X_3$. Further, when the output of the first OSM circuit $X_5$ is placed on the "L" level, due to its turning signal, the output of the inverter $I_7$, will be on the "H" level, the transistor $Q_5$ will be conductive and will forcibly charge the capacitor $C_4$, the input of the inverter $I_1$ will be lowered to the "L" level, therefore the output of the first OSM circuit $X_5$ will turn to the "H" level and, together with this operation, the second FF circuit $X_6$ will be positively reset. In this embodiment, in case the switch S is temporarily kept connected to the terminal b while the luminous element LED is lighted, the time when the luminous element LED first goes out will be an actual releasing time. Further, the "L" level holding time in the first OSM circuit $X_5$ is set, for example, to correspond to the longest time required to charge the capacitors $C_1$ and $C_2$ to a predetermined value with the lowest usable voltage of the current source.

By the way, in both embodiments, in the case of applying the driving circuit of the present invention to a photographic camera of a type in which continuous photographing can be automatically made, a delay time until the charged voltage of the capacitors $C_1$ and $C_2$ again reaches a predetermined value may be made to be kept from the end of one photographing to the beginning of the next photographing.

In the above mentioned explanation, the shutter is made to be opened directly by the driving coil $L_1$.

However, if the reflecting mirror is sprung up by the driving coil $L_1$ and the shutter is opened by the operation of this mirror, the present invention will be able to be applied also to a single-lens reflex camera.

Figure 3:
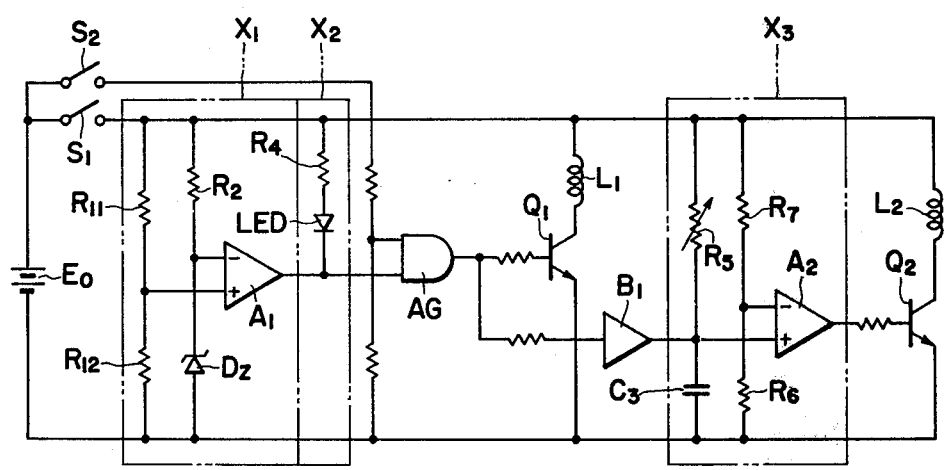
FIG. 3 is a wiring diagram showing still another embodiment of the driving circuit according to the present invention.

FIG. 3 shows an embodiment wherein a battery for feeding an electric current to the entire circuit is used as current source means for energizing the driving coils. In this embodiment, the same reference symbols are attached to substantially the same respective elements as are shown in FIGS. 1 and 2.

In FIG. 3, reference symbol $E_0$ indicates a current source battery. $L_1$ and $L_2$ indicate driving coils for making an opening operation and closing operation of a shutter. $Q_1$ and $Q_2$ indicate transistors for passing an electric current to the driving coils $L_1$ and $L_2$ when they are made conductive. $A_2$, $C_3$, $R_5$, $R_6$ and $R_7$ indicate respectively a comparator, capacitor, variable resistor and resistors constituting an exposure time controlling circuit $X_3$. $A_1$, $D_z$, $R_2$, $R_{11}$, $R_{12}$ and LED indicate respectively a comparator, Zener diode, resistors and an indicating element constituting a judging circuit $X_1$ for judging the voltage of the current source $E_0$ and an indicating circuit $X_2$. AG indicates an AND gate. $B_1$ indicates a buffer such as, for example, an open-collector TTL or the like. Thus, since capacitor $C_3$ is coupled to the output of AND gate AG through buffer $B_1$, capacitor $C_3$ is, in effect, short circuited when the output of AND gate AG is at the "L" level and, is placed in an open state when the output of AND gate AG is at the "H" level. $S_1$ indicates a switch for making judgement and indication. $S_2$ indicates a switch for releasing the shutter. In this case, the exposure time is set by the variable resistor $R_5$ and whether the voltage of the current source battery $E_0$ can well energize the driving coils $L_1$ and $L_2$ is judged by whether the potential of the conjunction point of the resistors $R_{11}$ and $R_{12}$ is higher or lower than the voltage in the reverse direction of the Zener diode $D_z$.

The operation of this circuit shall be explained in the following.

When the camera release is made, the switch $S_1$ will be closed in the initial stage. At this time, if $[R_{12}/(R_{11}+R_{12})] \cdot E_0 > V_{dz}$ (where $R_{11}$ and $R_{12}$ represent respectively the resistance values of the resistors $R_{11}$ and $R_{12}$, $E_0$ represents the voltage of the battery $E_0$ and $V_{dz}$ represents the voltage in the reverse direction of the Zener diode $D_z$), the output of the comparator $A_1$ will be on the "H" level and the input on one side of the AND gate AG will be placed on the "H" level. In this state, the luminous element LED will issue no light. Then, if the release is advanced, the switch $S_2$ will be closed. As a result, the input on the other side of the AND gate AG will be also on the "H" level, the gate will be opened and the output will turn to the "H" level. Therefore, the transistor $Q_1$ will be conductive to pass an electric current to the driving coil $L_1$ and the shutter will be opened by the energization of this coil $L_1$. The output of the buffer $B_1$ will be also on the "H" level and the capacitor $C_3$ will begin to be charged through the variable resistor $R_5$.

Thus, after the lapse of the time set by the variable resistor $R_5$, the voltage $V_{c3}$ between the terminals of the capacitor $C_3$ will be $V_{cl} \geq [R_6/(R_6+R_7)] \cdot E_0$ (where $R_6$ and $R_7$ represent respectively the resistance values of the resistors $R_6$ and $R_7$) and the output of the comparator $A_2$ will turn to the "H" level. As a result, the transistor $Q_2$ will be conductive to pass an electric current to the driving coil $L_2$ and the shutter will be closed by the energization of this coil $L_2$. On the other hand, when the switch $S_1$ is closed, if $[R_{12}/(R_{11}+R_{12})] \cdot E_0 < V_{dz}$, the output of the comparator $A_1$ will be on the "L" level and the input on one side of the AND gate AG will be placed on the "L" level. In this state, the indicating element LED will issue light and will indicate that the voltage of the current source $E_0$ can not well energize the driving coils $L_1$ and $L_2$. Therefore, even if the switch $S_2$ is then closed and the input on the other side of the AND gate AG is on the "H" level, the AND gate AG will not be opened. After all, its output will remain on the "L" level and no current will be passed to the driving coils $L_1$ and $L_2$.

Figure 4:
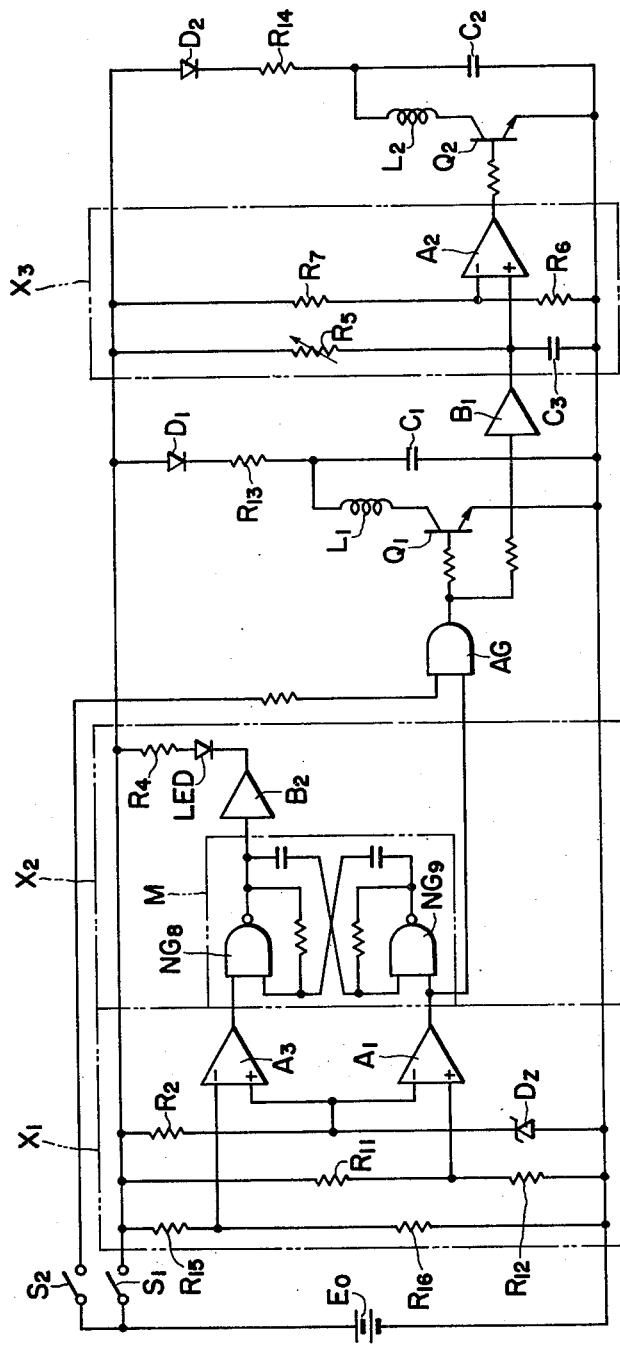
FIG. 4 is a wiring diagram showing still another embodiment somewhat different from that of FIG. 3.

Now the embodiment shown in FIG. 4 shall be explained. This embodiment is the same as of FIGS. 1 and 2 in respect that a capacitor which can be charged by a battery is used as current source means for energizing driving coils but is different from them in the function of the indicating circuit $X_2$. Here, too, the same reference symbols are used for substantially the same respective elements as in FIG. 3. In FIG. 4, reference symbols $C_1$ and $C_2$ indicate capacitors for respectively energizing driving coils $L_1$ and $L_2$ with their discharged current. $Q_1$ and $Q_2$ indicate transistors for respectively constituting closed circuits of the capacitor $C_1$—coil $L_1$ and capacitor $C_2$—coil $L_2$ when they are made conductive. $R_{13}$ and $R_{14}$ indicate resistors for respectively charging the capacitors $C_1$ and $C_2$. $D_1$ and $D_2$ indicate diodes for preventing interference. $A_3$ indicates a comparator. M indicates a non-stable multivibrator formed of NAND gates $NG_8$ and $NG_9$. $R_{15}$ and $R_{16}$ indicate resistors constituting a voltage dividing circuit for a precaution of the voltage of the current source $E_0$. $B_2$ indicates a buffer.

In the embodiment in FIG. 4, in order to prevent as much as possible the fear that the voltage of the current source $E_0$ which can well energize the driving coil $L_2$ before the shutter is released will be no longer able to well energize the coil $L_2$ due to the consumption of the circuit current while the shutter is opened, the capacitors $C_1$ and $C_2$ are charged with a small electric current and are discharged within a short time so as to well energize the coils $L_1$ and $L_2$. Further, the voltage by the resistors $R_{11}$ and $R_{12}$ and the voltage divided by the resistors $R_{15}$ and $R_{16}$ are set in the relation of $[R_{12}/(R_{11}+R_{12})] \cdot E_0 > [R_{16}/(R_{15}+R_{16})] \cdot E_0$ with a little difference between them so that, as described later, the precaution of the voltage drop of the current source $E_0$ may be made. That is to say, when the switch $S_1$ is closed, the capacitors $C_1$ and $C_2$ will be charged respectively through the diode $D_1$ and resistor $R_{11}$ and through the diode $D_2$ and resistor $R_{14}$. If $[R_{12}/(R_{11}+R_{12})] \cdot E_0 > [R_{16}/(R_{15}+R_{16})] \cdot E_0 > V_{dz}$, the output of the comparator $A_1$ will be on the "H" level, the output of the comparator $A_3$ will be on the "L" level, the input on one side of the AND gate AG will be placed on the "H" level, the output of the NAND gate $NG_8$ of the non-stable multivibrator M will be on the "H" level, therefore the output of the buffer $B_2$ will be also on the "H" level and the indicating element LED will issue no light. Therefore, if the switch $S_2$ is then closed, the same as in the above described case, the AND gate AG will be opened, the transistor $Q_1$ will be made conductive and a closed circuit of the capacitor $C_1$ and driving coil $L_1$ will be formed. As a result, the driving coil $L_1$ will be energized by the current discharged from the capacitor $C_1$ and the shutter will be opened. After a predetermined time, the shutter closing operation will be made. When the switch $S_1$ is closed, if $[R_{12}/(R_{11}+R_{12})] \cdot E_0 > V_{dz} > [R_{16}/(R_{15}+R_{16})] \cdot E_0$, both outputs of the comparators $A_1$ and $A_3$ will be on the "H" level. When the switch $S_2$ is them closed, the shutter opening and closing operations will be made, the NAND gates $NG_8$ and $NG_9$ will become active, the non-stable multivibrator M will begin to oscillate and the indicating element LED will be flickered. By this flickering, there will be made a precaution that the voltage of the current source $E_0$ will soon become to be of a value insufficient to charge the capacitors $C_1$ and $C_2$ to well energize the driving coils $L_1$ and $L_2$. Further, if the relation of the voltage is $V_{dz} > [R_{12}/(R_{11}+R_{12})] \cdot E_0 > [R_{16}/(R_{15}+R_{16})] \cdot E_0$, the output of the comparator $A_1$ will be on the "L" level, the output of the comparator $A_3$ will be on the "H" level and, even if the switch $S_2$ is closed, the AND gate AG will not be opened, the output of the NAND gate $NG_8$ of the non-stable multivibrator M will be on the "L" level and therefore the indicating element LED will be continuously illuminated to indicate that the voltage of the current source $E_0$ has lowered to a value insufficient to drive the shutter.

As described above, the embodiment shown in FIG. 4 is so formed particularly as to be able to give a precaution that the voltage of the current source battery will soon be below a predetermined value and therefore has an advantage that a proper information to the effect that it is necessary to replace the battery can be given to the photographer.

We claim:

1. A driving circuit for camera shutters comprising:
   a first driving coil for selectively opening a shutter;
   a first capacitor;
   means for selectively charging said first capacitor;
   means, responsive to control signals applied thereto and including a switching element, for controllably providing a first current path to discharge said first capacitor through said first driving coil;
   a voltage judging circuit, connected to said first capacitor, for generating a comparison signal indicative of whether the voltage of said means for selectively charging said first capacitor is above a predetermined value or not; and
   a controlling circuit connected between said voltage judging circuit and said switching element, for, responsive to said comparison signal, generating a control signal to said switching element to render said switching element conductive when the voltage of said first capacitor is above the predetermined value to effect provision of said first current path;
   a second driving coil for selectively closing said shutter;
   a second capacitor;
   means for selectively charging said second capacitor;
   means, responsive to control signals applied thereto and including a second switching element, for controllably providing a second current path to discharge said second capacitor through said second driving coil;
   a first one-shot multivibrator (OSM) circuit connected to said controlling circuit;
   a first flip-flop (FF) circuit connected to said first OSM circuit and operated by the shutter releasing operation; and
   an indicating circuit connected to said judging circuit and responsive to said comparison signal for generating indicia of when said first capacitor is below said predetermined value;
   said controlling circuit comprising a two input OR gate having a first input thereto connected to said first OSM circuit and the second input thereof receptive of said comparison signal; and
   a second FF circuit connected to said OR gate;
   a second OSM circuit and first inverter connected to said second FF circuit;
   an exposure timing controlling circuit connected to said first inverter;
   a third OSM circuit connected to said exposure time controlling circuit;
   a second inverter connected to said second OSM circuit;
   an AND gate connected to said second inverter and said third OSM circuit, said AND gate supplying said control signal to said first switching element to effect opening of said shutter; and
   a third inverter connected to said third OSM circuit, said third inverter supplying control signals to said second switching element to effect closing of said shutter.

2. A driving circuit for camera shutters according to claim 1 wherein said driving circuit further comprises a transistor connected to said first OSM circuit and a fourth inverter connected between said transistor and second FF circuit.

* * * * *